Figure 1:
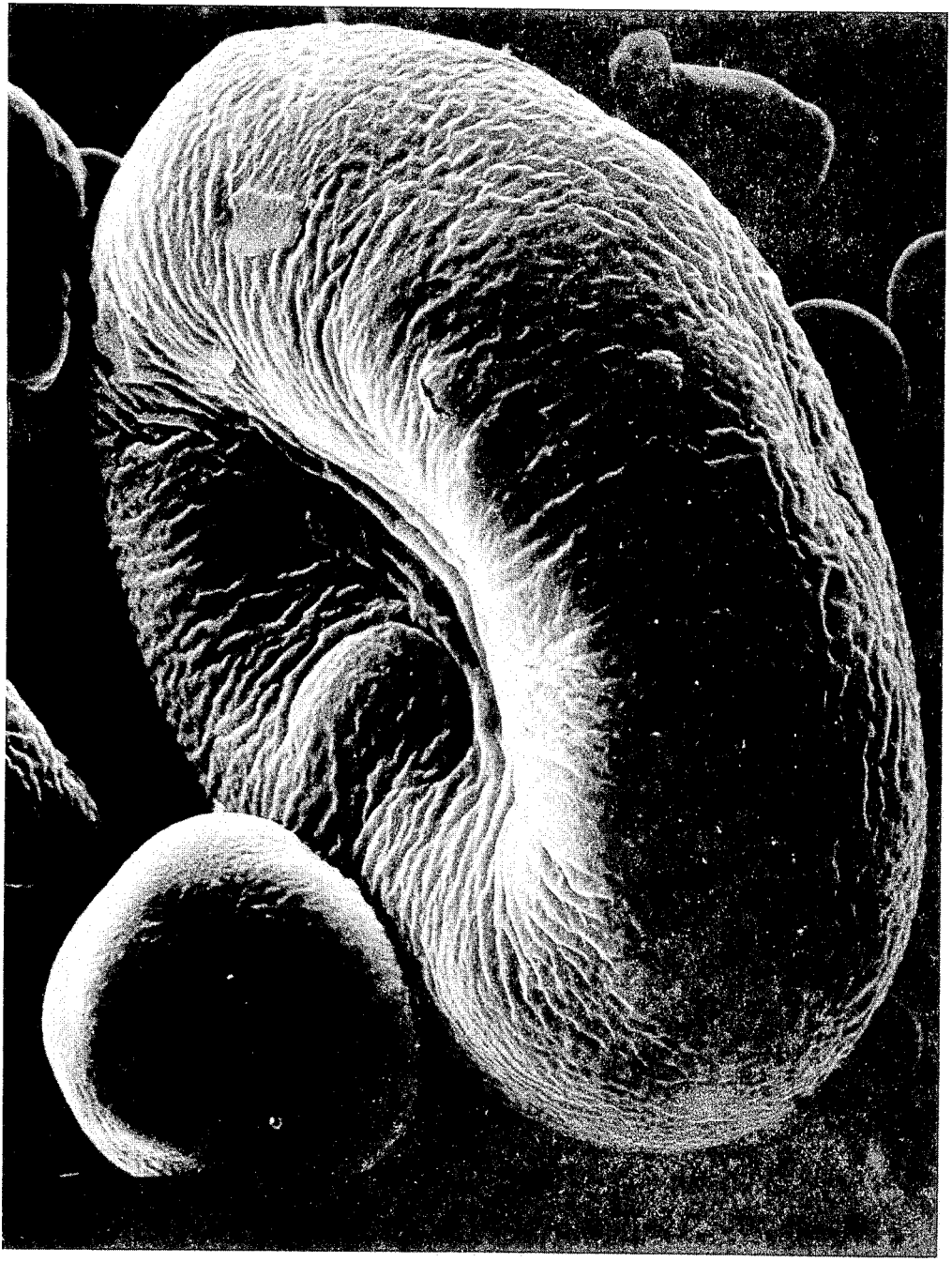

United States Patent [19]

Pisecky et al.

[11] 3,956,521

[45] May 11, 1976

[54] PROCESS FOR PRODUCING POWDER FROM MILK OR SIMILAR LIQUIDS

[75] Inventors: Jan Pisecky; Vagn Westergaard, both of Tastrup, Denmark

[73] Assignee: Aktieselskabet Niro Atomizer, Soborg, Denmark

[22] Filed: Oct. 18, 1974

[21] Appl. No.: 515,956

[30] Foreign Application Priority Data

Oct. 22, 1973 Germany............................ 2352894

[52] U.S. Cl. .............................. 426/588; 426/467; 426/471
[51] Int. Cl.² ............................................ A23C 1/04
[58] Field of Search ............ 426/187, 358, 467, 471, 426/588

[56] References Cited
UNITED STATES PATENTS 2,088,606  8/1937  Peebles et al. ...................... 426/471
2,835,597  5/1958  Barzelay ............................ 426/471

Primary Examiner—Jeanette M. Hunter
Attorney, Agent, or Firm—Sughrue, Rothwell, Mion, Zinn & Macpeak

[57] ABSTRACT

Milk or similar liquids are spray-dried into a powder having a considerable residual humidity, using an inlet temperature for the drying gas higher than usual. This spray-dried powder is after-dried in a fluidized bed. The fine particles entrained by the gas leaving the spray-drier and the fluidized bed are separated from said gases and added to the main bulk of powder after the latter has left the spray-drier and if necessary has been dried to such an extent that the fine particles will not stick thereto. A powder having very high bulk density is obtained and the heat economy is improved.

11 Claims, 3 Drawing Figures

PROCESS FOR PRODUCING POWDER FROM MILK OR SIMILAR LIQUIDS

The invention relates to a process for producing powder from milk or similar liquids, in which process the liquid, preferably in the form of a concentrate, in a first stage is spray-dried in hot gas by the use of a rotary atomizer into a moist powder which in a second stage is after-dried in hot gas in a fluidized bed to the desired moisture content of the final product, while the fine particles carried along are separated from the gas leaving the two stages.

The term fluidized bed is here used in the sense that it comprises also such driers in which the velocity of the drying gas is not sufficient for keeping the powder therein suspended, but where the mobility of the powder is chiefly brought about by vibration.

The expression "milk or similar liquids" is here intended to mean liquids which by a conventional spray drying, in which the drying process in the drying chamber is carried so far that the powder leaving the drying chamber possesses a moisture content that approximately corresponds to the residual moisture in the final product, form particles, the interior of which is to an essential degree filled with vacuoles. The occurrence of these vacuoles is a consequence of the fact that by the drying of the liquid particles formed by the spraying a film is formed which surrounds these particles and which by the conventional spray drying to the moisture content, which the final product is to have, achieves such a rigidity that, in spite of the vacuum created in the interior of the particles it does not collapse during the drying process, but retains a firm spherical shape and encloses the cavities which occur during the drying process in part due to the removal of liquid by evaporation, in part due to the expansion which in an earlier stage of the drying process takes place on account of the internal evaporation and the release and heating of the air contained in the liquid.

As examples of other liquids than milk and milk-containing products such as cocoa/milk mixes, including also sour milk products which contain live cultures of bacteria, which by the spray-drying process according to the conventional method produce particles with a high content of vacuoles, may be mentioned other protein-containing liquids such as egg white, egg yolk, whole eggs, gelatine solution and caseinate solutions as well as soya protein concentrate and isolate.

By the spray drying of liquids of this type according to the conventional method the said property causes that the powder produced gets a large volume of vacuoles and consequently a low density of the individual particles and a low bulk density. The low bulk density of the powder causes a large consumption of packing materials and corresponding space requirements at shipping and storage. Moreover, air will in the course of time make its way into the vacuoles, which air together with the air which is already present in the recently produced powder and originates from the air contained in the liquid drops will, on the powder being dissolved, be released and consequently, when the powder is being used, cause an inconvenient formation of foam.

Numerous measures have been suggested for achieving a powder with a higher bulk density in the spray drying of milk, cf. for example the British patent specification No. 1,044,501.

According to this patent specification, relative high bulk densities for skim-milk powder are achieved by a concentrate with a content of dry matter higher than normal and with a temperature higher than normal, preferably from 60°–65°C, being used as starting material and by the drying process being carried out in two stages and in such a way that in the first stage a powder having a water content between 4.5 and 7%, preferably between 4.5 and 6%, is obtained by spray drying, which powder is subsequently subjected to a secondary drying with hot gas to a water content of about 3.5%. In the patent specification it is stated that this process is particularly well suited in connection with the use of spray nozzles, but that it is also possible in certain cases to obtain good results by the use of an atomizer having a rotary atomizer wheel.

The said patent specification furthermore states the following examples of known measures to be taken to achieve a higher bulk density: an increase in the viscosity of the concentrate to be spray-dried, a reduction of the rate of revolution of the atomizer wheel or a reduction of the pressure in the atomizer nozzles as well as, finally, a modification of the inlet temperature of the drying gas of the spray drier.

This "modification" must by a person skilled in the art be understood as a reduction in the inlet temperature of the drying gas, not only due to the term selected, but also on the basis of what in general the relevant literature contains relating to the importance of the inlet temperature for the bulk density of the powder produced. By way of example it appears from K. Masters: "Spray Drying", Leonard Hill Books, London (1972), page 318, that an increase in the inlet temperature of the drying gas causes a reduction of the bulk density of the spray-dried products for all the materials for which results are reproduced in the passage in the literature mentioned above. It appears that this also should apply to gelatine solution, cf. U.S. Pat. No. 1,734,260.

Consequently is was surprising for the person skilled in the art that is was possible in using a rotary atomizer to obtain a higher bulk density than it has so far been possible and to obtain this by employing a process defined in the first paragraph of this specification, which process according to the invention is characterized by a combination of the following measures:

a. The temperature of the hot gas which is introduced into the first stage is at least 10°C higher than the highest temperature that would be permitted in connection with the liquid in question if the spray drying for producing the final product with the moisture content desired and with the same degree of heat damage were to be carried out, in only one stage, b. the spray drying in the first stage is accomplished to a moisture content of the powder leaving this stage which dependently on the liquid to be dried is 2–15% above the moisture content in the final product and the highest value of which is determined with due regard to the fact that agglomeration shall be substantially avoided, c. the fine particles separated from the gas are added to the main bulk of the powder produced after the latter has been dried to a moisture content of at the most 2–10%, so that the fine particles do not stick thereto to such an extent that stable agglomerates are formed.

In order to explain in greater detail the measure mentioned above under point a. it must be pointed out that in the case of the spray drying of liquids which contain heat-sensitive components, as is the case with the liquids to be taken into consideration as starting materials in the process according to the invention, an inlet temperature of the drying gas is normally used which is as high as permitted without the product being heat damaged to such a degree that desired properties of the product are lost. In the production of whole milk powder and skim-milk powder, a possible heat damage of the product especially asserts itself by a reduced solubility of the powder in water. In order that a product can earn the quality indication "Extra grade" according to ADMI a "Solubility index" is required which, measured according to the ADMI-method, in the case of whole milk powder is at the most 0.5 and in the case of skim-milk powder is at the most 1.25. In practice, however, a Solubility index of at the most 0.5 is usually required for both products. In the case of other products, possible heat damage asserts itself in a pronounced manner by other changes in the product. By way of example, a heat damage in the drying of sour milk products, which contain live bacteria, asserts itself by a considerable reduction of the activity of the bacteria in the powder produced. In the production of powder from egg white it is in particular the ability to be whipped which constitutes the critical feature of the final product, which ability would be reduced by a possible heat damage. These properties of the various liquids imply that a given degree of heat damage corresponds to a certain maximum inlet temperature of the drying gas if the drying is performed as a spray drying in a single stage to the desired moisture content.

In the process according to the invention, a higher temperature, than it has so far been possible to use in corresponding drying processes, is used, as stated under point a., and this can due to the fact that measures b. and c. have been taken, be done without increasing the heat damage, since the measure b. prevents the increased temperrature of the drying gas from causing an increase in the temperature of the powder and the measure c. prevents the fine particles from being led back into the atomizer cloud in the drying chamber as is the case in a conventional spray drying process in which an agglomeration is aimed at.

The measure c. can i.a. be accomplished by introducing the fine particles at the lower end of the drying chamber of the spray drier. In this case the fine relatively dry particles will coat the coarser particles in the drying chamber and thereby prevent that these stick together or adhere to the chamber walls. It is to be noted, however, that the adhesion of the fine particles to the coarser ones is rather weak, due to the fact that the fine particles are only brought in contact with the coarser particles after the latter have been dried to a certain extent as stated above. Therefore the fine particles, or at least most of them, will break apart from the coarser ones, i.a. when the final powder is subject to a pneumatic transport. This is in contrast to the known so-called "straight-through" processes in which the fine particles are introduced into the very atomizer cloud in which case stable agglomerates are formed.

Alternatively, the fine particles can, dependent on the properties of the product in question, be added to the main bulk of the product after this has been withdrawn from the spray drier and before or after it has been dried in the second stage or during the drying in said stage, as it will be described more detailed below.

By measure c. it is avoided that the fine particles cause the formation of agglomerated particles in the hot zone of spray drier, and this is of importance since it appears that — contrary to what was formerly the belief — the agglomerated particles are those that are most sensitive with regard to heat damage in the spray drier.

In a spray drying process it is attempted to operate with as high an inlet temperature of the gas introduced into the spray drier as possible, since thereby it is possible to achieve the best heat economy in the drying process. This appears from the fact that the percentage total thermal efficiency $\eta$ can be expressed approximately by means of the following equation:

$$\eta = \frac{T_1 - T_2}{T_1 - T_o} \times 100$$

in which $T_1$ represents the temperature of the drying gas at the inlet, $T_2$ represents the temperature of the drying gas at the outlet (applying to an adiabatic process) and $T_0$ represents the temperature of the surrounding air. It appears from this wellknown formula, that the thermal efficiency can be improved by $T_1$ being increased while at the same time $T_2$ and $T_0$ are kept substantially constant. Certainly, it is not possible in the case of an increase in $T_1$, which takes place according to the invention, to keep $T_2$ completely unchanged, but as compared to the increase in $T_1$ the increase in $T_2$ is unessential.

In the process according to the invention the temperature of the drying gas at the inlet to the spray drier is, as mentioned above, at least 10°C higher than the highest temperature that would be permitted in connection with the liquid in question if the spray drying for the production of the final product with the moisture content desired were to be performed in only one stage and with the same degree of heat damage. The determination of this lowest value of 10°C is based on the consideration that already by this increase in temperature a not unessential improvement of the heat economy is achieved. How far this increase in temperature may exceed the said 10° can be found out by simple experiments in each individual case, so that the maximum thermal efficiency of the drying gas is achieved while at the same time one should ensure that the heat damage to the powder is kept within acceptable limits. For example in the production of whole milk powder the increase in the inlet temperature of the drying gas, will amount to a value of between 10° and 90° in relation to the inlet temperature at a corresponding one-stage spray drying process.

By the use of the process according to the invention there is consequently in part obtained a product having a bulk density that is higher than that hitherto obtainable with spray driers having rotary atomizer wheels, in part a better thermal efficiency of the drying process, since at its introduction into the spray drier the drying gas has a higher temperature.

An additional feature of the process according to the invention, which feature contributes to the achievement of a particularly good thermal efficiency, is that, as is the case with the process according to the British patent specification already mentioned, it makes possible the use of a starting material having a relatively high content of dry matter without the final product getting heat damaged to any essential degree. In connection with the spray drying of milk products it is generally known that the use of a high content of dry matter in the starting material, under otherwise unchanged conditions, entails a poorer solubility of the final product, but nevertheless it is by the use of the process according to the invention possible also by the use of for example skim-milk concentrates having a very high content of dry matter as starting material to obtain products having a satisfactory solubility.

The moisture content of the powder, which is obtained from the spray drier, is, as mentioned above, 2–15% higher than the moisture content of the final product desired and depends on the type of liquid that is spray-dried. In order that it is possible to operate with as high an inlet temperature of the drying gas in the spray drier as possible without deterioration of solubility of the final product, it is desirable to remove the powder from the spray drier with a relatively high moisture content, but, on the other hand, the powder must of course not be so moist that it cannot be subjected to a drying treatment in the second stage, and in addition it must not be so moist either that in one or the other of the stages a considerable agglomeration of the particles occurs during the drying process, since such an agglomeration would cause a reduction of the bulk density and more heat damage of the final product. Consequently, a person skilled in the art will according to the type and concentration of the liquid to be spray-dried by experiments find out which moisture content is to be selected within the said field, in order that the optimum combination of a good thermal efficiency, a high bulk density of the powder and a good solubility of the final product may be achieved.

In the production of whole milk powder with a moisture content in the final product of 1.0–2.5% by weight from a whole milk concentrate with a content of dry matter of 45–57% by weight it has been found to be possible by use of a process according to the invention to obtain a bulk density of the powder of up to 0.67 g/cm$^3$, the said process being characterized in that the drying gas, which is introduced into the first stage, has a temperature of between 190° and 270°C and in that the spray drying in the first stage is carried on to a moisture content in the powder of 4–10% by weight. The achievement of a so high powder bulk density using a rotary atomizer wheel has to the knowledge of the applicants not been reported previously.

In the production of whole mile powder, the best combination of a good heat economy, a high bulk density of the powder and stable operation conditions is achieved by a process which is based on a whole milk concentrate with a content of dry matter of 50–54% by weight, in which process the gas supplied to the first stage has a temperature of between 240° and 260°C and the spray drying is carried on to a moisture content of 5–7% by weight. Thereby a bulk density of more than 0.65 g/cm$^3$ can usually be achieved.

In the production of skim-milk powder with a moisture content of 1–4% by weight the starting material is normally a skim-milk concentrate with a content of dry matter of 45–57% by weight and a process is used which according to the invention is characterized in that the hot gas, which is introduced into the frist stage, has a temperature of between 210° and 420°C and in that the spray drying in the first stage is carried on to a moisture content in the powder of 5–18% by weight. By this means it is possible to obtain a bulk density of the powder of up to 0.77 g/cm$^3$. This value is also to the knowledge of the applicants higher than those of all bulk densities obtained so far in the production of skim-milk powder by spray drying with rotary atomizer wheels.

The above-mentioned upper limit of 420°C has been determined due to the fact that for purely technical reasons it has not been possible to carry out successful experiments with still warmer drying gas. Thus the drying temperature was not limited to 420°C due to heat damage of the product.

In the production in practice of skim-milk powder the starting material will preferably, with the present technique, be a concentrate with a content of dry matter of 48–52% by weight, an inlet temperature for the drying gas led to the spray drier of 265°–285°C will be used and the spray drying process will be carried on to a moisture content of 4–6% by weight. Thereby a bulk density of more than 0.70 g/cm$^3$ can usually be achieved.

Figure 2:
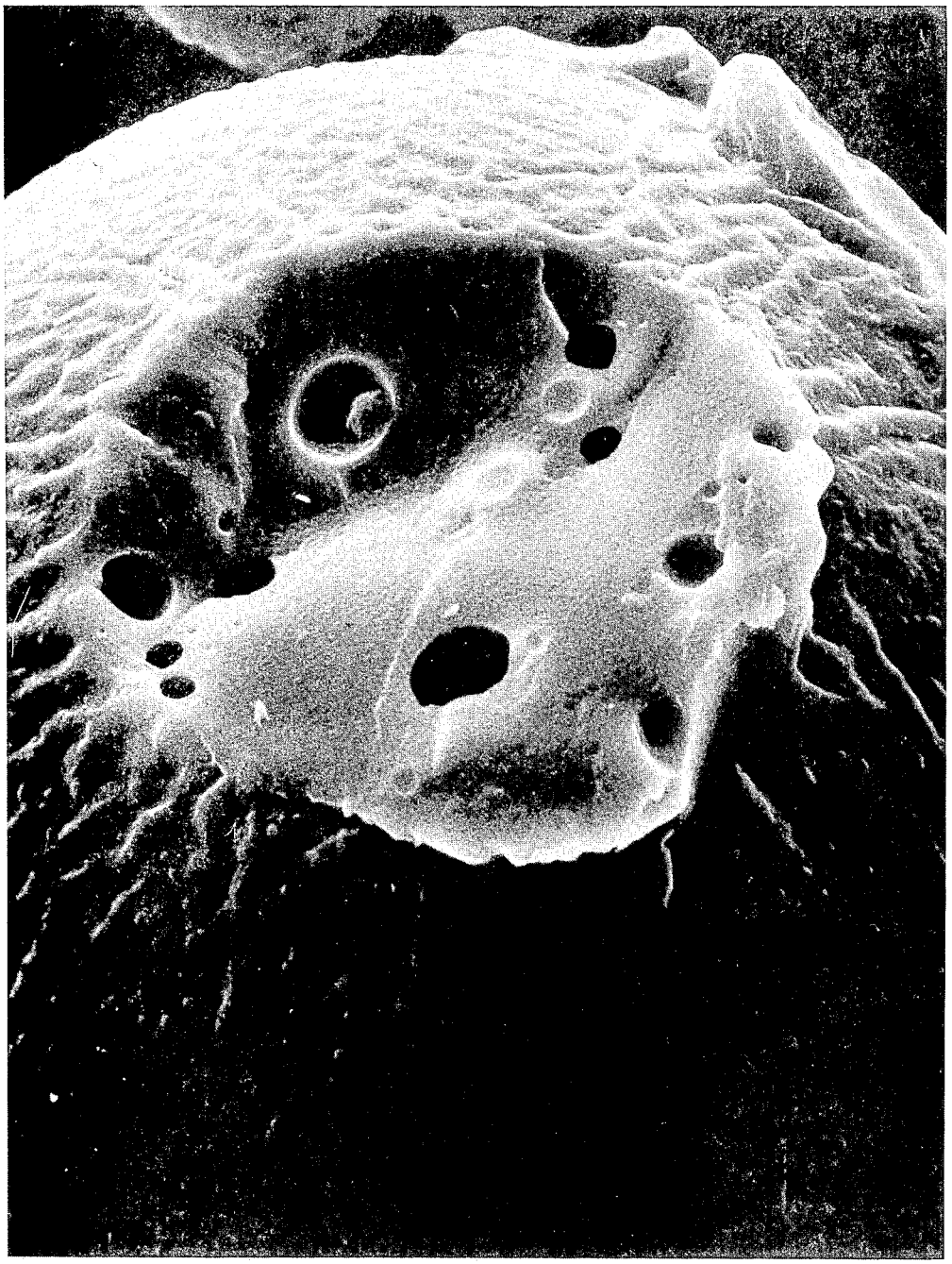
Figure 3:
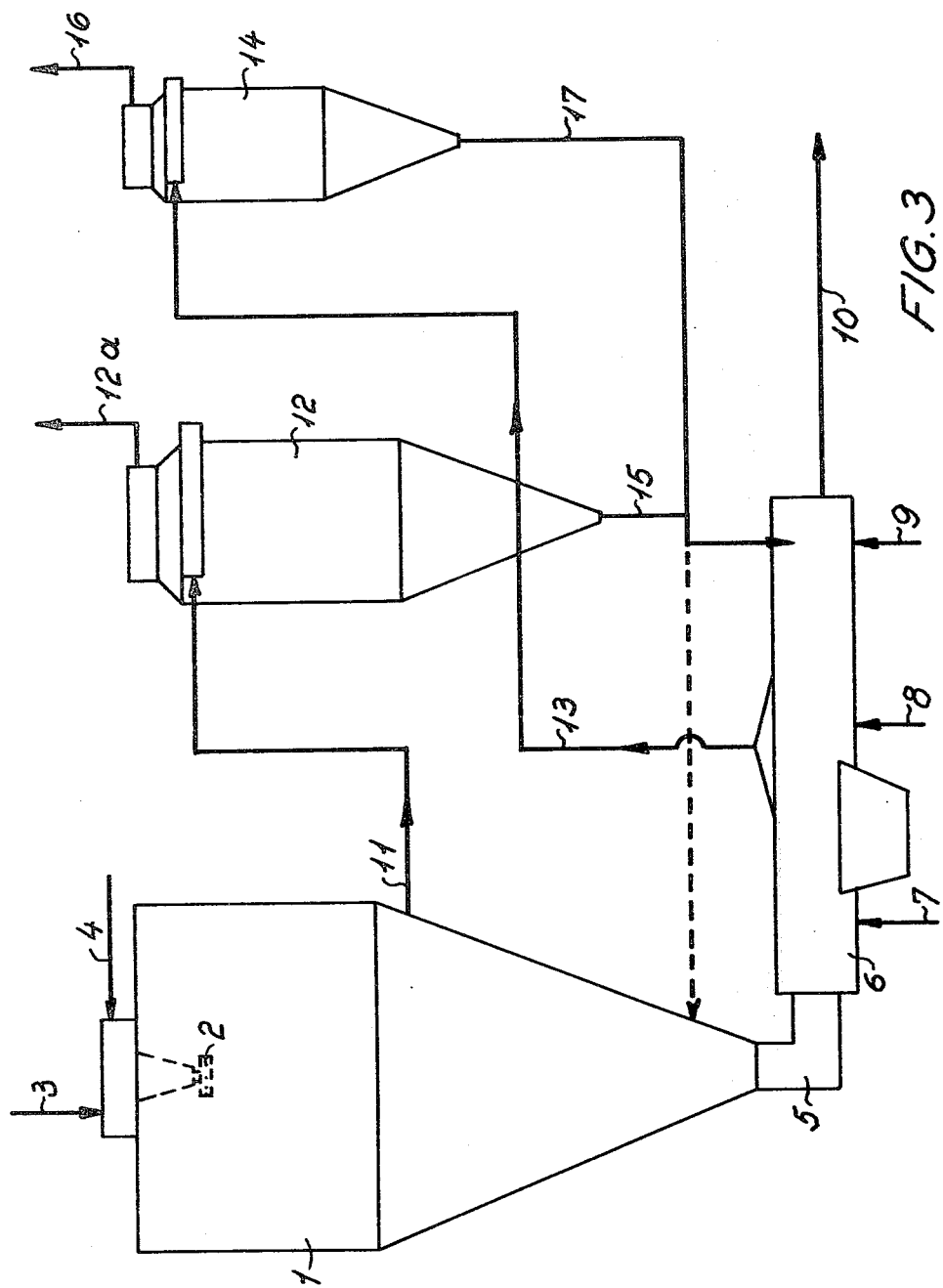

In order to explain the invention, reference will below be made to the drawing in which FIG. 1 is a photomicrograph of a particle of skim-milk powder produced in conformity with the process according to the invention, FIG. 2 is a phatomicrograph of a part of a particle of skim-milk powder produced in conformity with a prior art process and FIG. 3 is a flow sheet showing an embodiment of the process according to the invention.

The reason why a particularly high bulk density of the final product can be achieved by the use of the process according to the invention is in part that a smaller volume of the individual particles is occupied by vacuoles and in part that the particles are only agglomerated to a slight degree.

A microscopical examination of the particles of the skim-milk has shown that the individual particles have strongly collapsed walls which in several cases are concave. It must be supposed that this is due to the fact that when the process according to the invention is used the walls of the particles preserve their elasticity so long that the walls, under the influence of the vacuum which, as mentioned above, occurs in a certain stage of the drying of the particles, can be sucked inwardly.

The probability of this assumption is supported by FIG. 1 which is a photomicrograph of skim-milk powder produced in conformity with the process according to the invention. The linear enlargement of this photomicrograph is such that a reproduction in size 8.3 cm × 11.0 cm would correspond to 1000 times. It appears clearly from this photograph that the wall of the main particle has been sucked in at a stage where the wall has still been rather soft. Moreover it is seen that the finer particles are not agglomerated.

In contradistinction to this, microscopical examinations of skim-milk powder, which in the spray drier has been dried to a residual moisture of 3.8%, show that the individual perticles have an approximately spherical shape and have convex surfaces.

This appears from FIG. 2 which is a photomicrograph of skim-milk powder produced according to said prior art process. The linear enlargement of this photomicrograph is such that a reproduction in size 8.3 × 11.0 cm would correspond to 2000 times. This photograph shows a part of a particle of which by chance a small fraction has been removed. Thereby some of the vacuoles in the interior are made visible. Although only part of the particle is shown the photo indicate that the particle has a ball-like shape.

Since according to the process described the drying in the first stage is carried out in conformity with the statement under point b. and since by the measure c. being taken it is avoided that the fine particles separated from the outlet gas from the spray drier and from the fluidized bed are led back into atomizer cloud of the spray drier, where they might produce large stable agglomerates, there is by the process according to the invention obtained a product which is only agglomerated to a slight degree, which feature, as mentioned above, contributes to the achievement of the high bulk density.

In many of the prior art processes for the production of powder from liquids of the kind that can be treated by the process according to the invention, particularly in the prior art processes for the production of the so-called instantly soluble (instant) whole milk powder and skim-milk powder, the aim was to obtain an extensive agglomeration since thereby the product obtains a good wettability and consequently its reconstitution is facilitated. The product, which is produced in conformity with the process according to the invention, has, due to the lack of agglomeration, a relatively low ability of reconstitution. However, this is only of minor importance in the numerous cases, in which mechanical equipment is used anyway in the reconstitution, or in the frequently occurring cases in which no reconstitution proper at all occurs, that is to say when milk powder is kneaded into relatively solid masses, as for example in the production of chocolate, pastry or sausages.

The process according to the invention is explained in greater detail with reference to the flow sheet which diagrammatically illustrates the process.

In this drawing, 1 designates a spray drier with a rotary atomizer wheel 2. The liquid to be spray-dried is supplied via a pipe 3, said liquid being preferably a concentrate as for example whole milk concentrate or skim-milk concentrate. Via a line 4, drying gas is supplied having a temperature fulfilling the condition mentioned under point a.

The proportion between the quantity of liquid supplied via the pipe 3 and the quantity of drying gas introduced via the line 4 is so adjusted that the powder leaving the spray drier via its powder outlet 5 possesses a moisture content that fulfils the requirement mentioned above under point b.

From the powder outlet 5 the powder enters a drying apparatus comprising a fluidized bed, which drying apparatus is preferably of the vibration type.

In the drying apparatus 6, drying gas for the drying and cooling of the powder is supplied via the line 7, 8 and 9, so that the powder can leave the drying apparatus 6 via a line 10 with the residual moisture content desired.

The outlet gas from the spray drier 1, which gas contains a lot of fine particles, leaves the spray drier via a line 11 and enters a cyclone 12. The outlet gas, which leaves the drying apparatus via a line 13, likewise contains a lot of fine particles and is led to a cyclone 14.

The gas, from which particles have been removed in the cyclone 12, is blown off through a line 12a, while the powder separated in the cyclone leaves the cyclone underneath the cyclone via a line 15. correspondingly, the gas from which particles have been removed in the cyclone 14 is blown off through a line 16, while the powder is removed from the bottom of the cyclone through a line 17. In the embodiment illustrated the lines 15 and 17 are united and lead the powder separated in the cyclones and consisting of fine particles back to the main bulk of the product, the said powder being returned in a place near the outlet from the vibrating drying apparatus 6. Alternatively, the powder from the lines 15 and 17 might of course also be added to the main bulk of the product in an additional stage. The decisive factor is only that this powder consisting of fine particles is not, as is otherwise frequently the case, led back to the atomizer cloud in the spray drier 1 where it might produce stable agglomerates. Moreover, the powder, which leaves the cyclone 12 via the line 15, must not be added to the main bulk of the product at a point immediately before or in the foremost part of the drying apparatus 6 if at this point the bulk of the product is sticky as is for example the case in the production of sugar-containing products, for instance products for baby food. In the production of ordinary whole milk powder or skim-milk powder the fine particles coming from the cyclones can on the other hand usually be introduced into the foremost part of the drying apparatus without any danger of an agglomeration occurring.

In the production of skim-milk powder of whole milk powder the fine particles coming from the cyclone 14 will often have so high a moisture content that it is necessary to add them to the main bulk of the product at or near the inlet end of the vibrating drying apparatus 6, whereas the fine particles from the cyclone 12 are usually so dry that they can be added to the main bulk after the latter has been removed from the drying apparatus 6.

As mentioned above the fine particles can in some circumstances advantageously be introduced in the bottom part of the spray drier. This embodiment is illustrated by the dotted lines on the flow sheet.

The process according to the invention is explained in greater detail by means of the following comparison and embodiment example.

EXAMPLES 1-15

A series of experiments were performed in a spray drying equipment of the NIRO ATOMIZER make. The drying chamber had a diameter of 10 m and was equipped with a rotary atomizer. The atomizer wheel had a diameter of 210 mm and its rate of revolution amounted to 15,000 rpm during all the Examples 1-15.

The exact information regarding the conditions under which the experiments were carried out and regarding the results achieved can be obtained from the tables I and II.

In the examples 1-8, a skim-milk concentrate was used as starting material, and in the examples 9-15 the starting material was a whole milk concentrate.

In the examples 1-6 and 9-13, a vibrated fluidized bed drying apparatus was connected after the spray drier, into which drying apparatus the drying gas with a temperature of 90°C was introduced.

In the examples 1-5 and 9-12, which are examples of embodiments of the process according to the invention, the fine particles, separated from the outlet gas from the spray drier chamber and from the vibrating drying apparatus, were led into the main bulk of the powder, and this occurred at the outlet from the vibrating drying apparatus.

in contradistinction to this, the fine particles separated from the outlet gas from the drying chamber and the drying apparatus were in the case of examples 6 and 13, which were both comparison experiments according to the prior art straight-through process, led back into the atomizer cloud in the spray drying chamber.

The examples 7–8 and 14–15 are comparison experiments which were carried out in the same spray drier, but without any afterdrying, that is to say that the drying process was carried out in such a way that the spray-dried product constituted the final product with the water content desired. In these cases, the fine particles were not led back into the atomizer cloud in the drying chamber, but mixed with the powder leaving at the bottom of the drying chamber.

The bulk densities of the products obtained were determined after each sample, the bulk density of which was to be found, had been tapped 1250 times, that is to say so as to have a constant volume. The solubility was determined according to ADMI, and the values found in this way for the Solubility index are entered into the tables. The degree of scorched particles was also determined according to ADMI.

By comparing the results of the experiments the following is, inter alia, noted.

In the examples 1–4 and 9–12, in which the experiments were carried out in conformity with the process according to the invention, products were obtained with essentially higher bulk densities than was the case with the comparison examples 6–8 and 13–15, respectively.

In example 3 the drying gas had when admitted to the spray drier a temperature which was 10°C higher than the corresponding temperature in the comparison examples 6 and 8, but nevertheless the solubility of the product obtained in example 3 is exactly as good as that of the product obtained in example 6 and considerably better than the solubility of the product obtained in example 8. In example 3 the same solubility as in example 7 was obtained in spite of the fact that at the inlet to the spray drier the drying gas had a temperature that was 30°C higher.

A comparison of examples 1 and 2 to example 6 shows that when the same inlet temperature of the drying gas is used during the operation a better solubility is obtained in conformity with the process according to the invention than in conformity with the straight-through process and, as already mentioned, in addition a far higher bulk density.

Examples 4 and 5 show that in conformity with the process according to the invention the inlet temperature can, in contradistinction to what applies to the straight-through process and the single-stage process, be increased considerably before an essential reduction of the solubility of the product can be expected.

The results obtained in the examples 9–15 with a whole milk concentrate reported in Table II show the same tendency as the results in the examples 1–8 with a skim-milk concentrate.

Table I

| Example No. | Skim-milk 1 | 2 | 3 | 4 | 5 | 6 | 7 | 8 |
|---|---|---|---|---|---|---|---|---|
| Content of dry matter in the concentrate in %. | 48 | 52 | 52 | 52 | 50 | 50 | 48 | 48 |
| Temperature of the drying gas at the inlet in °C. | 200 | 200 | 210 | 250 | 270 | 200 | 180 | 200 |
| Temperature of the drying gas at the outlet in °C. | 81 | 85 | 86 | 90 | 90 | 87 | 97 | 99 |
| Water content of the spray-dried powder in %. | 6.5 | 6.5 | 6.5 | 6.5 | 6.5 | 6.5 | 3.4 | 3.5 |
| Water content in the final product in %. | 3.4 | 3.5 | 3.4 | 3.6 | 3.4 | 3.5 | 3.4 | 3.5 |
| Bulk density of the powder in g/cm³. | 0.74 | 0.77 | 0.76 | 0.70 | 0.68 | 0.55 | 0.69 | 0.68 |
| Solubility index (ADMI) | 0.1 | 0.1 | 0.1, | 0.2 | 0.2 | 0.1 | 0.1 | 0.5 |
| Degree of scorched particles (ADMI) | A | A | A | A | A | A | A | A |

Table II

| Example No. | Whole milk 9 | 10 | 11 | 12 | 13 | 14 | 15 |
|---|---|---|---|---|---|---|---|
| Content of dry matter in the concentrate in %. | 48 | 50 | 50 | 52 | 50 | 50 | 50 |
| Temperature of the drying gas at the inlet in °C. | 180 | 180 | 190 | 200 | 180 | 160 | 180 |
| Temperature of the drying gas at the outlet in °C. | 78 | 80 | 81 | 83 | 83 | 98 | 100 |
| Water content in the spray-dried powder in %. | 5.5 | 5.5 | 5.5 | 5.5 | 5.5 | 2.3 | 2.5 |
| Water content in the final product in %. | 2.2 | 2.3 | 2.2 | 2.1 | 2.4 | 2.3 | 2.5 |
| Bulk density of the powder in g/cm³. | 0.65 | 0.67 | 0.66 | 0.67 | 0.52 | 0.64 | 0.63 |
| Solubility index (ADMI) | <0.1 | <0.1 | 0.1 | 0.3 | 0.1 | 0.1 | 0.5 |
| Degree of scorched particles (ADMI) | A | A | A | A | A | A | A |

EXAMPLE 16.

In this example a spray drying pilot plant with a diameter of the drying chamber of 2.2 m was used. The diameter of the atomizer wheel was 110 mm and its rate of revolution was 18,000 rpm.

The after-drying was effected in a vibrated fluidized bed drying apparatus to which drying gas of a temperature of about 110°C was supplied. The fine particles which were separated from the outlet gas from the spray drying chamber were mixed with the main bulk after the latter had been removed from the vibrating drying apparatus, while the fine particles separated from the outlet gas from the drying apparatus were reintroduced at the inlet end of the latter.

A skim-milk concentrate with a content of dry matter of 46% by weight, heated to 40°C, was used as starting material.

The additional conditions prevailing during the experiment and the results achieved were as follows:

| | |
|---|---|
| Inlet temperature of the drying gas | 400°C |
| Outlet temperature of the drying gas | 79°C |
| Water content in spray-dried powder | 14.5% |
| Water content in final product | 4% |
| Bulk density of powder *) | 0.71 g/cm³ |
| Solubility index (ADMI) | 0.5 |

*) Determined one powder separated from the outlet gas from the vibrated fluidized bed drying apparatus.

It appears from the above result of the experiment that by means of the process according to the invention it is possible to use a far higher inlet temperature for the drying gas for the spray drier than it has so far been regarded as possible in the production of skim-milk powder without deterioating the solubility unacceptably.

What is claimed is:

1. In a process for producing powder from liquids which when spray-dried form particles containing a substantial amount of vacuoles, such as milk, in which process the liquid, preferably in the form of a concentrate, is, by the use of a rotary atomizer in a first stage, spray-dried in hot gas into a moist powder which in a second stage is after-dried in hot gas in a fluidized bed to the moisture content of the final product desired, while the particles carried along are separated from the gas leaving the two stages, wherein the improvement comprises the steps of:
   a. raising the temperature of the hot gas which is supplied to the first stage to at least 10°C higher than the highest temperature which would be permissible for the liquid in question if the spray drying for the production of the final product with the moisture content desired were to be performed in only one stage and with the same degree of heat damage,
   b. spray drying in the first stage wherein the moisture content of the powder obtained from this stage, dependently on the liquid to be dried, is 2–15% higher than the desired moisture content in the final product and the highest value of which moisture content is determined with due regard to the fact that agglomeration shall be substantially avoided, and
   c. separating the fine particles from the the gas and adding them to the main bulk of the powder produced after the latter has been dried to a moisture content of at the most 2–10%, so that the fine particles do not stick thereto to such an extent that stable agglomerates are formed.

2. A process as claimed in claim 1 for the production of whole milk powder with a moisture content of 1.0–2.5% by weight and with a Solubility index according to ADMI of at the most 0.5 from a whole milk concentrate with a content of dry matter of 45–57%, wherein the hot gas, which is supplied to the first stage, has a temperature of between 190° and 270°C and the spray drying in the first stage is carried on to a moisture content of the powder of 4–10% by weight.

3. A process as claimed in claim 2 in which the starting material is a whole milk concentrate having a content of dry matter of 50–54% by weight, wherein the gas supplied to the first stage has a temperature of between 240° and 260°C and the spray drying in the first stage is carried on to a moisture content of 5–7% by weight.

4. A process as claimed in claim 1 for the production of skim-milk powder with a moisture content of 1–4% by weight and with a Solubility index according to ADMI of at the most 0.5 from a skim-milk concentrate having a content of dry matter of 45–57% by weight, wherein the hot gas supplied to the first stage has a temperature of between 210° and 420°C and the spray drying in the first stage is carried on to a moisture content in the powder of 5–18% by weight.

5. A process as claimed in claim 4 in which the starting material is a skim-milk concentrate with a content of dry matter of 48–52% by weight wherein the gas supplied to the first stage has a temperature of between 265° and 285°C and the spray drying in the first stage is carried on to a moisture content of 4–6% by weight.

6. A process as claimed in claim 1 for the production of powder of milk containing products, wherein the fine particles separated from the gas leaving the first stage and the second stage are added to the main bulk of the powder in the lower part of the first stage.

7. Powder produced by a process as claimed in claim 1.

8. Whole milk powder produced by a process as claimed in claim 3.

9. Whole milk powder as claimed in claim 8 and having a bulk density higher than 0.65 g/cm³.

10. Skim-milk powder produced by a process as claimed in claim 5.

11. Skim-milk powder as claimed in claim 10 and having a bulk density higher than 0.70 g/cm³.

* * * * *